(12) United States Patent
Choi et al.

(10) Patent No.: US 9,771,058 B2
(45) Date of Patent: Sep. 26, 2017

(54) CONTROL METHOD OF HYBRID VEHICLE

(71) Applicants: Hyundai Motor Company, Seoul (KR); Kia Motors Corporation, Seoul (KR)

(72) Inventors: Yongkak Choi, Seoul (KR); Yonghoon Lee, Seoul (KR); Jeamun Lee, Seoul (KR); Hoon Han, Hwaseong-si (KR); Kyungtaek Lee, Seoul (KR); Seongik Park, Seoul (KR); Ilkwon Park, Seoul (KR); Sangjoon Kim, Seoul (KR); Jaeyun Shim, Hwaseong-si (KR); Joonyoung Park, Seoul (KR); Ineok Cho, Incheon (KR); Namil Choi, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/561,115

(22) Filed: Dec. 4, 2014

(65) Prior Publication Data

US 2016/0090077 A1    Mar. 31, 2016

(30) Foreign Application Priority Data

Sep. 25, 2014    (KR) .................... 10-2014-0128434

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |

(Continued)

(52) U.S. Cl.
CPC ............ *B60W 10/08* (2013.01); *B60W 10/02* (2013.01); *B60W 10/06* (2013.01); *B60W 20/11* (2016.01); *B60W 20/40* (2013.01); *B60W 2050/001* (2013.01); *B60W 2050/0012* (2013.01); *B60W 2540/103* (2013.01); *B60W 2710/0644* (2013.01); *Y02T 10/48* (2013.01); *Y02T 10/6286* (2013.01)

(58) Field of Classification Search
CPC ...... B60W 20/00; B60W 10/08; B60W 10/06; Y02T 10/6286; B60K 6/445
USPC ........................................................ 701/22
See application file for complete search history.

(56) References Cited

U.S. PATENT DOCUMENTS

| | | | |
|---|---|---|---|
| 8,996,217 B2* | 3/2015 | Tanishima ............ | B60L 11/123 180/65.245 |
| 2014/0100730 A1* | 4/2014 | Park ...................... | B60W 10/06 701/22 |

FOREIGN PATENT DOCUMENTS

| | | |
|---|---|---|
| JP | 2003-212003 A | 7/2003 |
| JP | 2013-67337 A | 4/2013 |

(Continued)

*Primary Examiner* — Maceeh Anwari
(74) *Attorney, Agent, or Firm* — Morgan, Lewis & Bockius LLP

(57) ABSTRACT

A control method of a hybrid vehicle may include performing a series of commands by a control portion including determining whether an accelerator pedal change amount detected by an accelerator pedal sensor is greater than a predetermined value, starting up an engine through a Hybrid Shaft Generator (HSG) during conversion into an HEV mode from an EV mode, controlling the engine to output constant torque, and synchronizing engine torque with motor torque to engage a clutch.

7 Claims, 5 Drawing Sheets

(51) Int. Cl.
*B60W 10/08* (2006.01)
*B60W 10/06* (2006.01)
*B60W 10/02* (2006.01)
*B60W 20/40* (2016.01)
*B60W 20/11* (2016.01)
*B60W 50/00* (2006.01)

(56) References Cited

FOREIGN PATENT DOCUMENTS

| | | |
|---|---|---|
| JP | 2013-79005 A | 5/2013 |
| JP | 5418690 B2 | 11/2013 |
| KR | 10-2008-0053819 A | 6/2008 |
| KR | 10-0837461 B1 | 6/2008 |
| KR | 10-0916429 B1 | 9/2009 |

\* cited by examiner

CONTROL METHOD OF HYBRID VEHICLE

CROSS-REFERENCE TO RELATED APPLICATION

The present application claims priority to Korean Patent Application No. 10-2014-0128434 filed Sep. 25, 2014, the entire contents of which is incorporated herein for all purposes by this reference.

BACKGROUND OF THE INVENTION

Field of the Invention

The present invention relates to a control method of a hybrid vehicle. More particularly, the present invention relates to a control method of a hybrid vehicle for improving fuel efficiency and reducing time for clutch engagement during conversion into an HEV mode from an EV mode according to driver's acceleration will.

Description of Related Art

A hybrid vehicle is a vehicle using two or more power sources and generally refers to a hybrid electric vehicle driven using an engine and a motor. A hybrid electric vehicle may form various structures using two or more power sources including an engine and a motor.

In general, a hybrid electric vehicle uses a power train in a manner of a transmission mounted electronic device (TMED) in which a motor, and a transmission and drive shaft are connected in series to each other.

In addition, a clutch is disposed between an engine and a motor. According to whether the clutch is engaged, the hybrid electric vehicle is driven in an electric vehicle (EV) mode or in a hybrid electric vehicle (HEV) mode.

The EV mode is a mode in which a vehicle is driven by only driving torque of a motor. The HEV mode is a mode in which the vehicle is driven by driving torque of the motor and the engine.

Upon being converted into the HEV mode from the EV mode, the hybrid vehicle synchronizes engine torque with motor torque and then engages a clutch. Synchronization of engine torque with motor torque is referred to as torque blending.

However, according to conventional art, during conversion into an HEV mode from an EV mode, engine speed is synchronized with motor speed while an engine is zero-torque controlled for a predetermined period of time and the clutch is engaged. Accordingly, problems arise in that impact is applied to the clutch according to engine torque and torque blending time for synchronization of engine torque with motor torque is lengthened.

In addition, since the engine is zero-torque controlled for a predetermined period of time, problems arise in that fuel efficiency of the vehicle is degraded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method of a hybrid vehicle having advantages of preventing impact from being applied to a clutch according to engine torque and minimizing torque blending time for synchronization of engine torque with motor torque during conversion into an HEV mode from an EV mode.

Various aspects of the present invention are also directed to providing a control method of a hybrid vehicle for improving fuel efficiency of a vehicle during conversion into an HEV mode from an EV mode.

According to various aspects of the present invention, a control method of a hybrid vehicle may include performing a series of commands by a control portion including determining whether an accelerator pedal change amount detected by an accelerator pedal sensor is greater than a predetermined value, starting up an engine through a Hybrid Shaft Generator (HSG) during conversion into an HEV mode from an EV mode, controlling the engine to output constant torque, and synchronizing engine torque with motor torque to engage a clutch, in which the hybrid vehicle includes the engine for combusting fuel to generate power, the HSG for starting up the engine and functioning as a generator while the engine is started up to generate electrical energy, a motor supporting the power of the engine and functioning as a generator during braking to generate electrical energy, a battery charged with the electrical energy generated by the HSG and the motor, the clutch disposed between the engine and the motor, the accelerator pedal sensor for detecting manipulation of an accelerator pedal, and a control portion for controlling the engine, the HSG, the motor, the battery, and the clutch using the accelerator pedal change amount detected by the accelerator pedal sensor, The controlling the engine to output constant torque may include controlling the engine according to an engine torque command output from an engine torque map that is defined from ignition timing, a fuel amount, and an air amount introduced to a cylinder of the engine according to torque demand determined by a change amount detected by the accelerator pedal sensor, and controlling a difference between target engine speed and engine speed according to the engine torque command to track the target engine speed through the HSG.

The engine torque command may be determined in consideration of the torque demand, motor speed, a state of the battery, a state of the HSG, the engine speed, and the target engine speed.

The engine torque command may be determined as a minimum value of a torque command output from the engine torque map defined according to the torque demand and motor speed, a torque command output from a battery map defined according to a limited charging amount of the battery and the target engine speed, a torque command output from an HSG map defined according to the state of the HSG, and a torque command output from an engine map defined according to the difference between the target engine speed and the engine speed.

The EV mode may be converted into the HEV mode when the change amount detected by the accelerator pedal sensor is greater than the predetermined value.

The controlling may include outputting and controlling an HSG torque command using, as input, a result obtained by performing feed-forward control using the engine torque command as input and a result obtained by performing proportional-Integral control on the difference between the engine speed and the target engine speed.

In the control method of the hybrid vehicle according to the aforementioned various embodiments of the present invention, during conversion into an HEV mode from an EV mode, torque output from an engine may be supplied to a motor through a HSG for a predetermined period of time, thereby minimizing power consumed in a battery and improving fuel efficiency.

In addition, an engine may output constant torque in an EV mode period, thereby minimizing torque blending time for synchronizing engine torque with motor torque.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
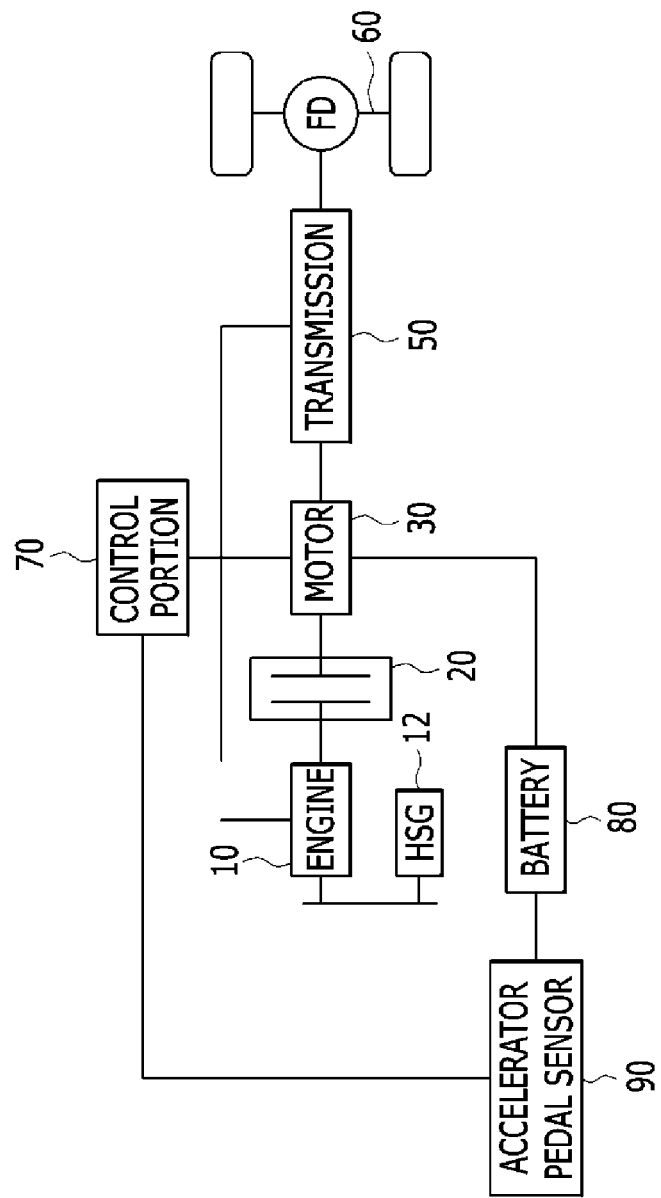
FIG. 1 is a schematic view illustrating a structure of an exemplary control apparatus of a hybrid vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The hybrid vehicle according to various embodiments of the present invention will be described below in terms of an example of a structure using a manner of a transmission mounted electric device (TMED). However, the scope of the present invention may not be limited thereto and may also be applied to other types of hybrid electric vehicles.

The control apparatus of a hybrid vehicle according to various embodiments of the present invention includes an engine 10, a Hybrid Shaft Generator (HSG) 12, a motor 30, a battery 80, a clutch 20, an accelerator pedal sensor 90, and a control portion 70.

The engine 10 combusts fuel to generate power.

The HSG 12 starts up the engine 10 and functions as a generator while the engine 10 is started up to generate electrical energy. The motor 30 supports power of the engine 10 and functions as a generator during braking to generate electrical energy.

The motor 30 is driven using electrical energy charged in a battery and the electrical energy generated by the motor 30 and the HSG 12 is charged in the battery 80.

The accelerator pedal sensor 90 detects manipulation of an accelerator pedal.

An accelerator pedal change amount detected by the accelerator pedal sensor 90 is provided to the control portion 70. Driver's acceleration will is determined from the accelerator pedal change amount detected by the accelerator pedal sensor 90 and a driving mode of the hybrid vehicle is converted into a hybrid electric vehicle (HEV) mode from an electric vehicle (EV) mode according to the driver's acceleration will.

The control portion 70 controls components of a vehicle including the engine 10, the HSG 12, the motor 30, the battery 80, and the clutch 20.

The control portion 70 may be configured as at least one processor that is operated according to a predetermined program that is configured to perform each step of the control method of a hybrid vehicle according to various embodiments of the present invention.

Hereinafter, a control method of a hybrid vehicle according to various embodiments of the present invention will be described in detail with reference to the accompanying drawings.

Figure 2:
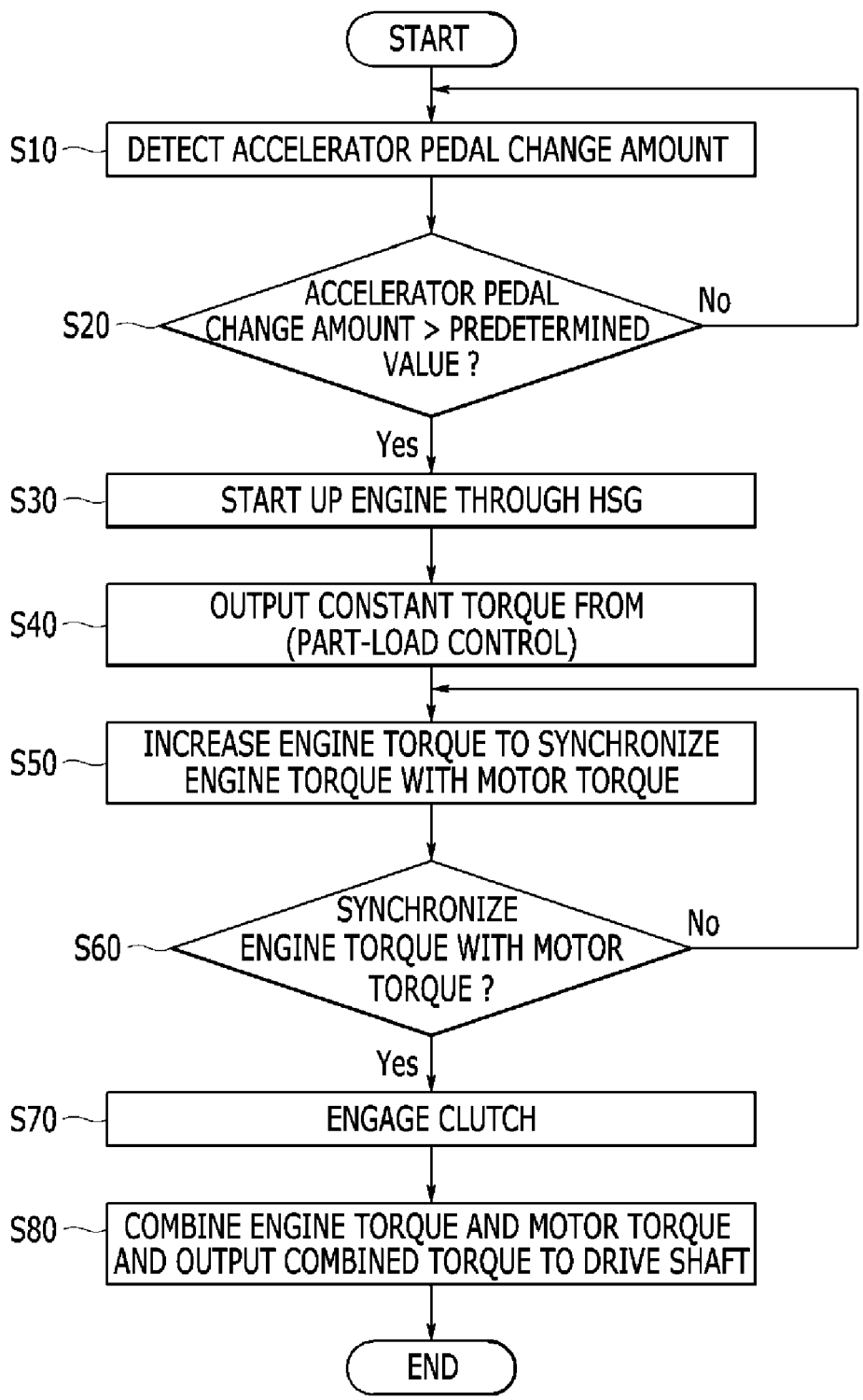
FIG. 2 is a flowchart of an exemplary control method of a hybrid vehicle according to the present invention.

FIG. 2 is a flowchart illustrating an exemplary control method of a hybrid vehicle according to various embodiments of the present invention.

Figure 3A:
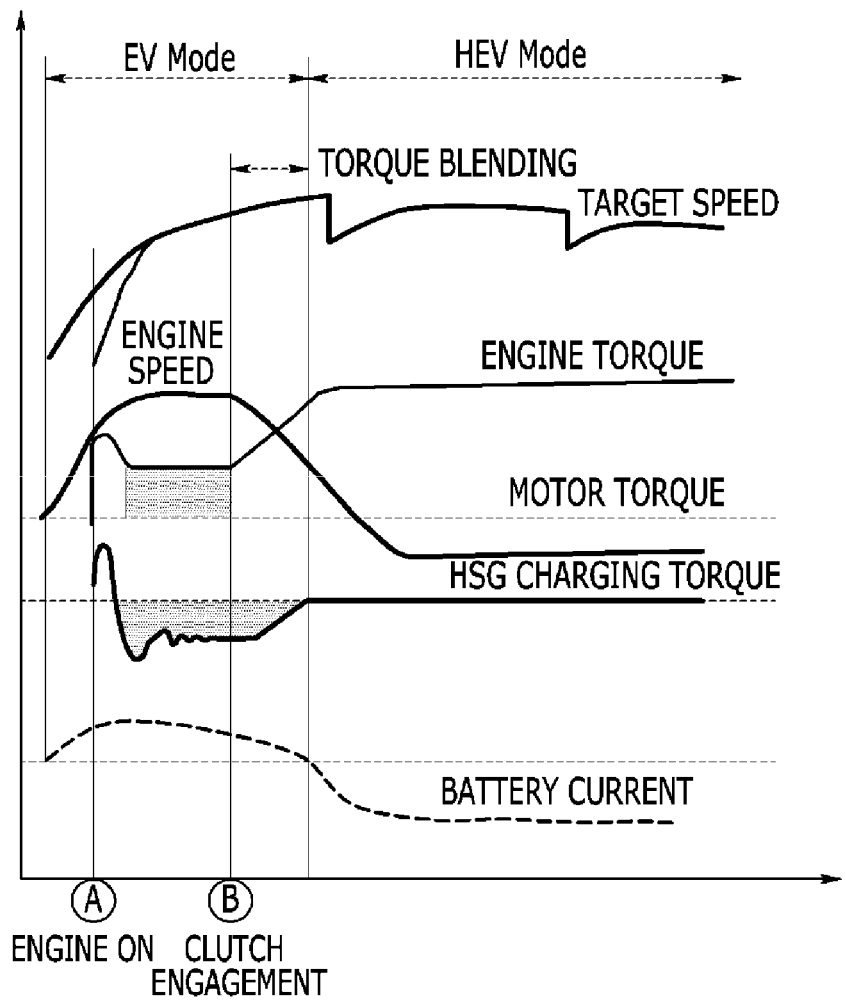
FIG. 3A and FIG. 3B are graphs illustrating a control signal of a hybrid vehicle according to the present invention.
Figure 3B:
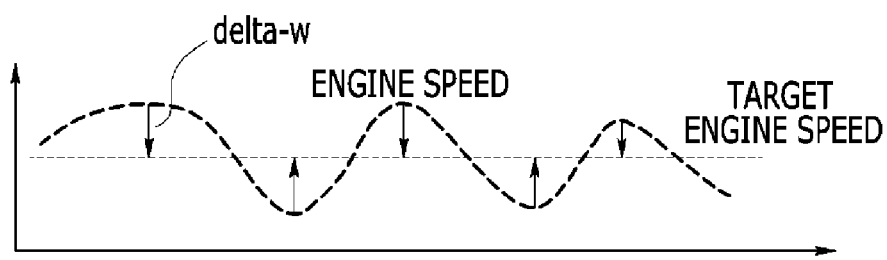

FIG. 3A and FIG. 3B are graphs illustrating a control signal of a hybrid vehicle according to various embodiments of the present invention.

As shown in FIG. 2, FIG. 3A and FIG. 3B, the accelerator pedal detecting sensor detects an accelerator pedal change amount and provides the detected accelerator pedal change amount to the control portion 70 (S10).

The control portion 70 determines whether the accelerator pedal change amount detected by the accelerator pedal detecting sensor is greater than a predetermined value (S20) and converts a driving mode into an HEV mode from an EV mode when the accelerator pedal change amount is greater than the predetermined value. That is, when the accelerator pedal displacement detected by the accelerator pedal sensor 90 is greater than the predetermined value, the control portion 70 determines that the driver has acceleration will and converts the driving mode of the vehicle into an HEV mode from an EV mode.

During conversion of the driving mode of the hybrid vehicle into an HEV mode from an EV mode, the control portion 70 starts up the engine 10 through the HSG 12 in an EV mode period (S30).

When the engine 10 is started up, an engine speed (RPM) is enhanced and the control portion 70 controls the engine 10 to output constant torque. In addition, the constant torque output from the engine 10 is provided to the battery 80 through the HSG 12 (S40).

As such, before the driving mode is changed into an HEV mode, in an EV mode, the constant torque output from the engine 10 is provided to the motor 30 through the HSG 12 without passing through the battery 80. Accordingly, battery efficiency may be prevented from being degraded due to charging and discharging of the battery 80, and output of the battery 80 may be compensated for through the HSG 12.

In addition, during control of torque output from the engine 10, the control portion 70 may achieve optimum fuel efficiency through part-load control. The part-load control will be described later in detail.

The control portion 70 increases the engine torque for engagement of the clutch 20 and synchronizes the engine torque with motor torque (S50).

When the engine torque is synchronized with the motor torque (S60), the control portion 70 engages the clutch 20 (S70) and combines the engine torque and the motor torque and outputs the combined torque to a drive shaft 60 (S80). In this case, the engine torque is controlled using the aforementioned part-load control method.

Hereinafter, the part-load control method will be described in detail.

The control portion 70 determines driver power demand based on the accelerator pedal change amount detected from the accelerator pedal detecting sensor. The control portion 70 controls torque of the engine 10 according to an engine torque command output from an engine torque map that is defined from ignition timing, a fuel amount, and an air amount introduced to a cylinder of the engine 10 according to the torque demand and motor speed.

In this case, the engine torque command may be determined in consideration of driver torque demand, motor speed, a state of the battery 80, a state of the HSG 12, engine speed, and target engine speed.

Figure 4:
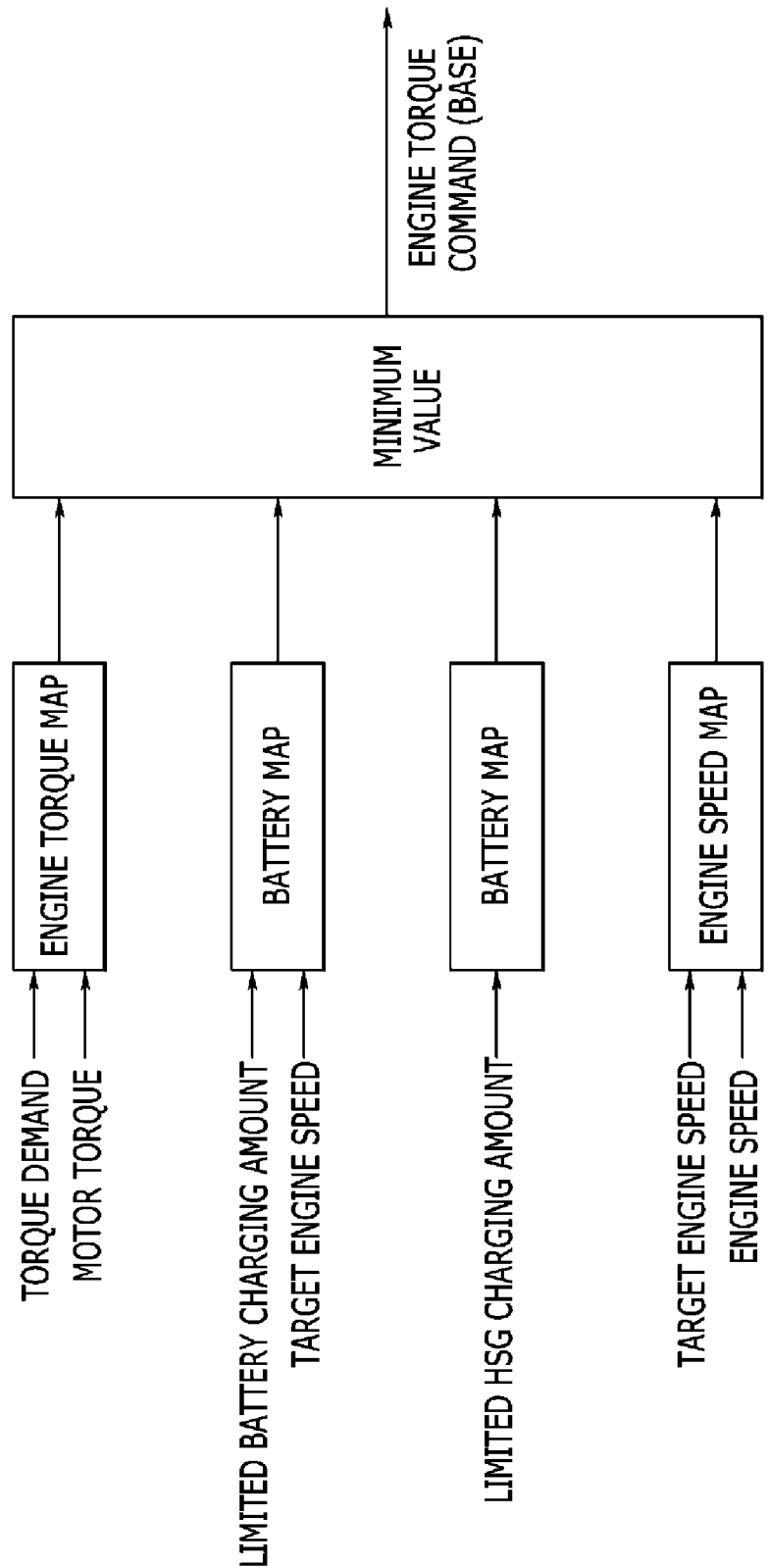
FIG. 4 is a block diagram illustrating a method for determining a hybrid engine torque command according to the present invention.

In detail, as shown in FIG. 4, the engine torque command may be determined as a minimum value of a torque command output from an engine torque map, a torque command output from a battery map, a torque command output from an HSG map, and a torque command output from an engine map.

As described above, the engine torque map is defined according to the driver torque demand and motor speed and base torque of the engine torque command.

The battery map is defined according to a limited charging amount of the battery and target engine speed and is used to limit controllable engine output torque in consideration of a battery state.

The HSG map is defined according to a temperature state of the HSG 12 and is used to limit controllable engine output torque in consideration of a state of the HSG 12.

In addition, the engine speed map is defined according to target engine speed and engine speed and is used to limit engine output torque when a difference between the engine speed and the target engine speed is large.

As such, during control of the engine 10 using the part-load control method, optimum engine control may be achieved in consideration of a battery state, a state of the HSG 12, engine speed, etc. as well as driver torque demand.

In addition, a difference between target engine speed and engine speed according to the engine torque command is controlled to track the target engine speed through the HSG 12.

Figure 5:
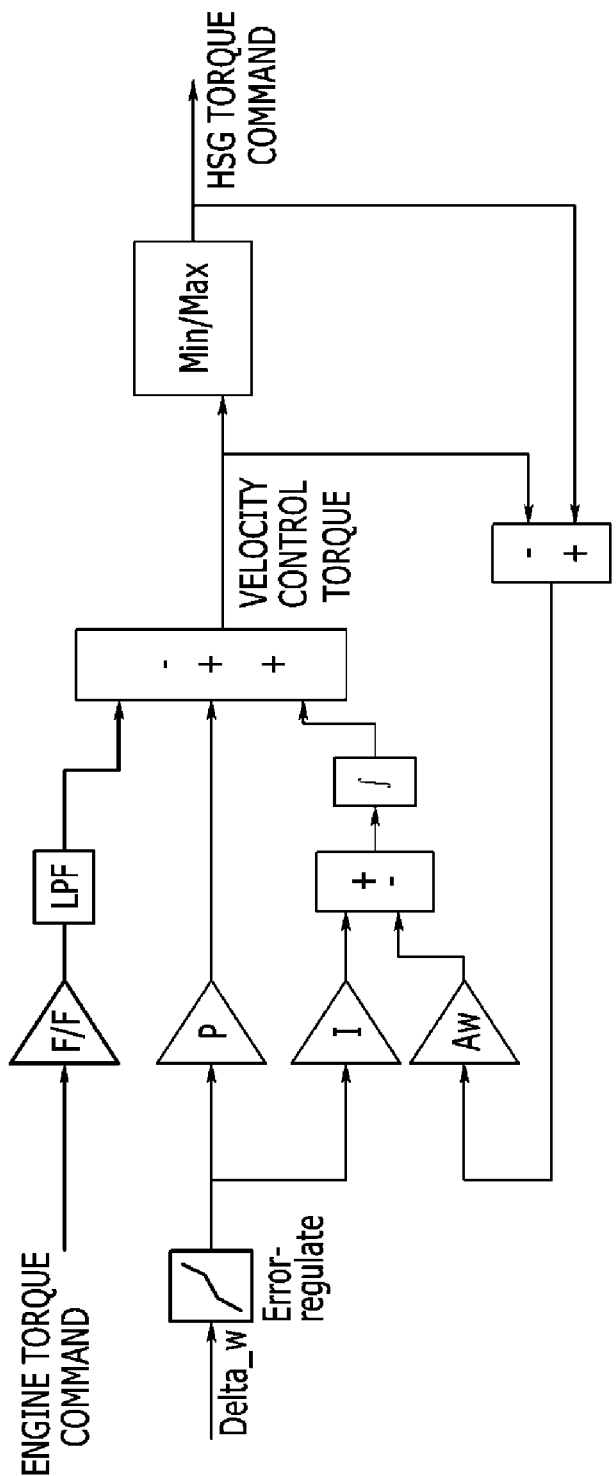
FIG. 5 is a block diagram illustrating control logic for engine speed estimation control of a hybrid vehicle according to the present invention.

In detail, as shown in FIG. 5, the HSG torque command is output using, as input, a result obtained by performing feed-forward control using the engine torque command as input and a result obtained by performing proportional-Integral control on a difference delta_w between engine speed and target engine speed.

As such, when constant torque is output from the engine 10 in an EV mode period or engine torque is controlled in an HEV mode period, the engine torque may be controlled using an engine torque command output from the engine torque map and a difference between engine speed and target engine speed is controlled to track the target speed using the HSG 12 (so-called 'part-load control'), thereby improving fuel efficiency.

In addition, constant torque may be output by the engine 10 in an EV mode period such that engine torque is rapidly reached in an HEV mode during conversion into the HEV mode from an EV mode. That is, torque blending time for synchronization of engine torque with motor torque may be minimized.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method of a hybrid vehicle including an engine, a motor, and a clutch disposed between the engine and the motor, the control method comprising:
    determining whether an accelerator pedal change amount detected by an accelerator pedal sensor is greater than a predetermined value in an electric vehicle (EV) mode;
    starting up the engine through a Hybrid Starter Generator (HSG) and then controlling the engine to output torque before engaging the clutch; and
    engaging the clutch and combining engine torque and motor torque when engine speed is synchronized with motor speed during a conversion into a HEV mode from the EV mode;
    wherein the engine torque during the conversion of driving mode into the HEV mode from the EV mode is provided to the motor through the HSG.

2. The control method of claim 1, further including:
    controlling the engine according to an engine torque command output from an engine torque map defined from ignition timing, a fuel amount, and an air amount introduced to a cylinder of the engine according to torque demand determined by a change amount detected by the accelerator pedal sensor; and
    controlling a difference between target engine speed and the engine speed according to the engine torque command to track the target engine speed through the HSG.

3. The control method of claim 2, wherein the engine torque command is determined in consideration of the torque demand, the motor speed, a state of the battery, a state of the HSG, the engine speed, and the target engine speed.

4. The control method of claim 3, wherein the engine torque command is determined as a minimum value of a torque command output from the engine torque map defined according to the torque demand and the motor speed, a torque command output from a battery map defined according to a limited charging amount of the battery and the target engine speed, a torque command output from an HSG map defined according to the state of the HSG, and a torque command output from an engine map defined according to the difference between the target engine speed and the engine speed.

5. The control method of claim 1, wherein the EV mode is converted into the HEV mode when the change amount detected by the accelerator pedal sensor is greater than the predetermined value.

6. The control method of claim 2, wherein the controlling includes:
    outputting and controlling an HSG torque command using, as input, a result obtained by performing feed-forward control using the engine torque command as input and a result obtained by performing proportional-Integral control on the difference between the engine speed and the target engine speed.

7. The control method of claim 1, wherein constant torque output from the engine is provided to the motor through the HSG.

* * * * *